United States Patent
Niemczyk

(10) Patent No.: US 9,969,211 B2
(45) Date of Patent: *May 15, 2018

(54) MOUNTING ARRANGEMENT FOR INSTALLING AUXILIARY VEHICLE WHEELS

(71) Applicant: Andrew Niemczyk, Hazel Park, MI (US)

(72) Inventor: Andrew Niemczyk, Hazel Park, MI (US)

(*) Notice: Subject to any disclaimer, the term of this patent is extended or adjusted under 35 U.S.C. 154(b) by 27 days.

This patent is subject to a terminal disclaimer.

(21) Appl. No.: 15/072,766

(22) Filed: Mar. 17, 2016

(65) Prior Publication Data
US 2016/0303897 A1    Oct. 20, 2016

Related U.S. Application Data

(63) Continuation-in-part of application No. 14/702,853, filed on May 4, 2015, now Pat. No. 9,688,099.

(60) Provisional application No. 62/146,529, filed on Apr. 13, 2015.

(51) Int. Cl.
B60B 11/02    (2006.01)

(52) U.S. Cl.
CPC ......... B60B 11/02 (2013.01); *B60B 2900/551* (2013.01); *B60B 2900/711* (2013.01); *B60B 2900/721* (2013.01)

(58) Field of Classification Search
CPC ......... B60B 11/02; B60B 11/06; B60B 15/26; B60B 15/263; B60B 3/147
See application file for complete search history.

(56) References Cited

U.S. PATENT DOCUMENTS

| 2,635,012 | A |   | 4/1953  | Rappaport |
|-----------|---|---|---------|-----------|
| 3,664,709 | A |   | 5/1972  | Barr'e    |
| 3,790,218 | A |   | 2/1974  | Johns     |
| 3,990,747 | A |   | 11/1976 | Long      |
| 4,007,968 | A | * | 2/1977  | Solis ................. B60B 11/02 301/38.1 |
| 4,070,066 | A |   | 1/1978  | Reppert et al. |
| 4,135,765 | A |   | 1/1979  | Hardwicke |
| 4,164,358 | A |   | 8/1979  | Entrup    |
| 4,396,232 | A |   | 8/1983  | Fox       |
| 4,585,276 | A |   | 4/1986  | Tirheimer |
| 4,776,640 | A |   | 10/1988 | Rezza     |
| 4,787,679 | A |   | 11/1988 | Arnold    |

(Continued)

*Primary Examiner* — Kip T Kotter
(74) *Attorney, Agent, or Firm* — John R. Benefiel

(57) ABSTRACT

A mounting arrangement for adding an auxiliary wheel spaced from an existing wheel of a motor vehicle including two or more generally cylindrical spacers connected together abutting end to end, an inner spacer attached to a brake assembly member with a preexisting wheel rim compressed between an inside face of the inner spacer and the brake assembly member, and an outer spacer connected to the inner spacer by bolts, and holding stud bolts extending out and received through holes in the auxiliary wheel rim, with lug nuts fixing the rim of the auxiliary wheel against the outside end of the outer spacer. An intermediate spacer between the inner and outer spacers may alternatively be provided detachably connecting the inner and outer spacers together, attached to an outside end of the inner spacer and to the inside end of the outer spacer by bolts.

9 Claims, 10 Drawing Sheets

(56) References Cited

U.S. PATENT DOCUMENTS

| | | | |
|---|---|---|---|
| 4,902,074 A | 2/1990 | DeRegnaucourt et al. | |
| 6,250,722 B1 | 6/2001 | Radke | |
| 6,568,764 B2 | 5/2003 | McNeil et al. | |
| 6,848,526 B2 | 2/2005 | Burt et al. | |
| 7,040,713 B2 | 5/2006 | Rudolf et al. | |
| 7,413,259 B2 | 8/2008 | Verdun et al. | |
| 8,690,265 B2 | 4/2014 | Noblanc et al. | |
| 2002/0190570 A1* | 12/2002 | Gorges | B60B 3/145 301/35.629 |
| 2005/0225105 A1* | 10/2005 | Meyer | B60B 19/02 295/8.5 |

* cited by examiner

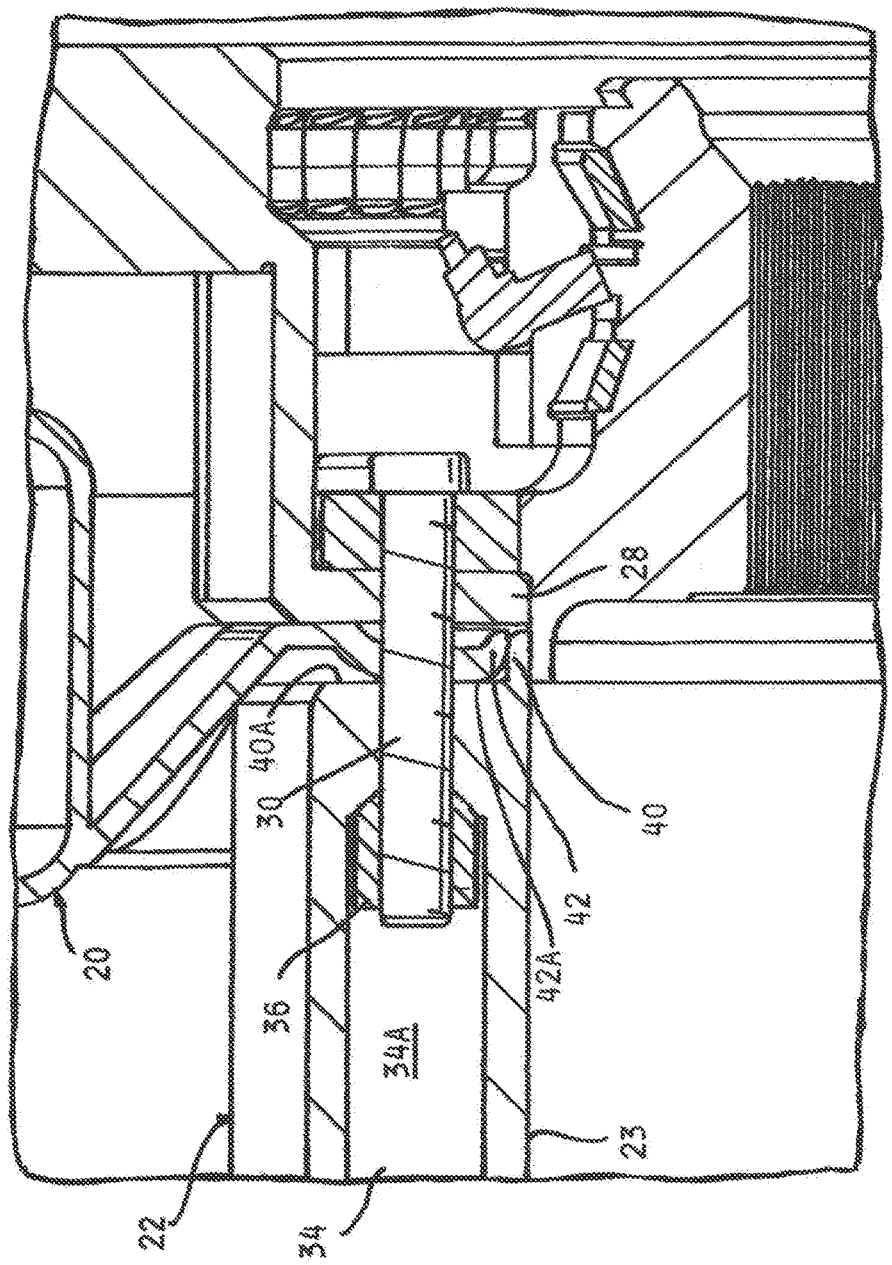

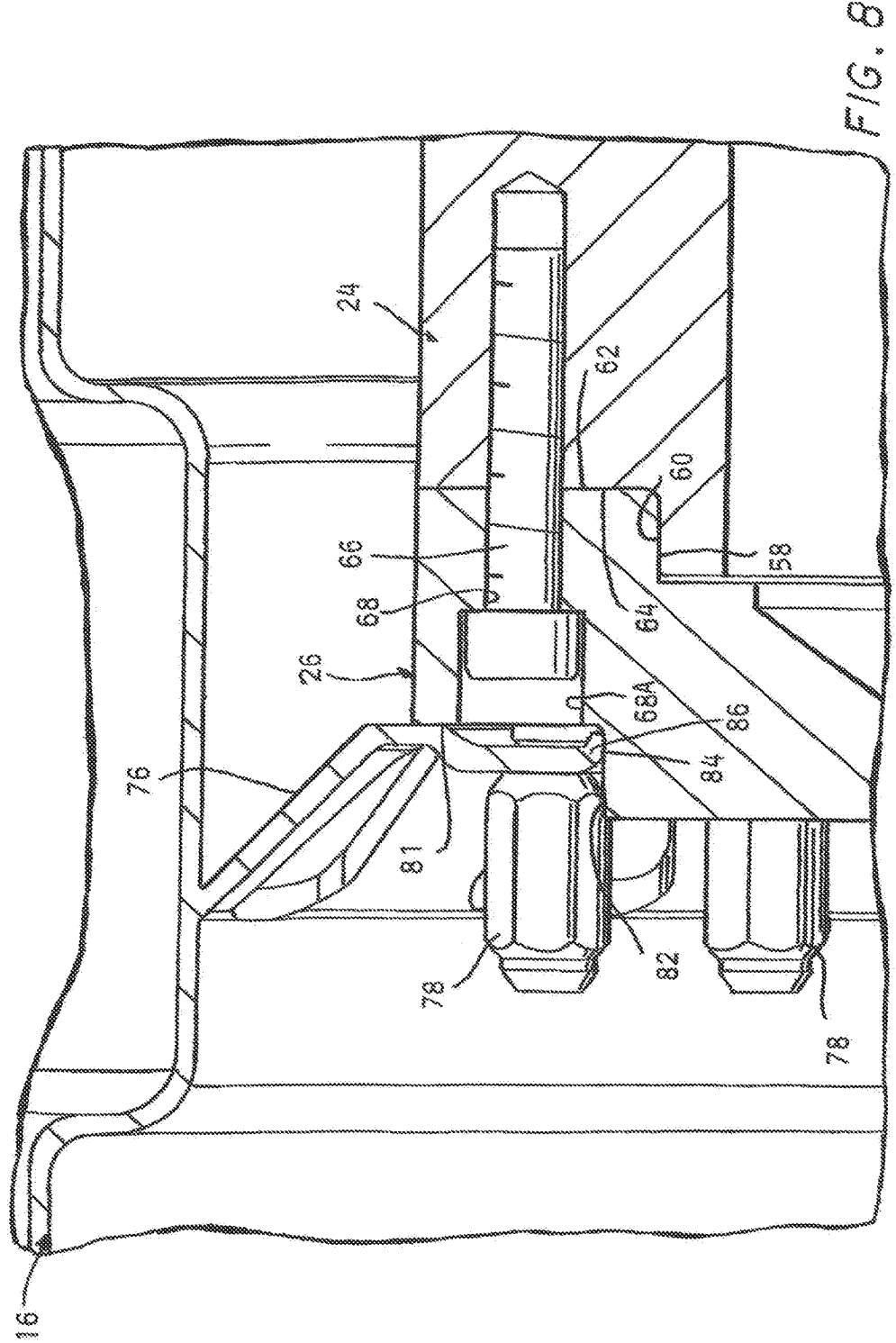

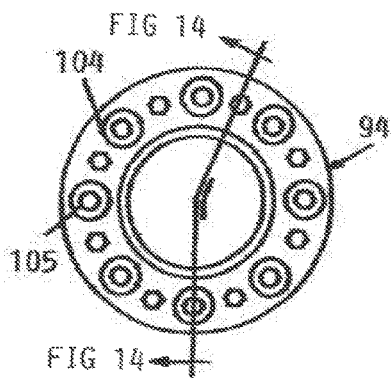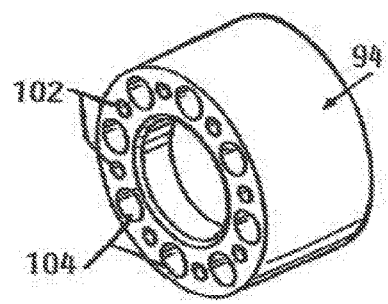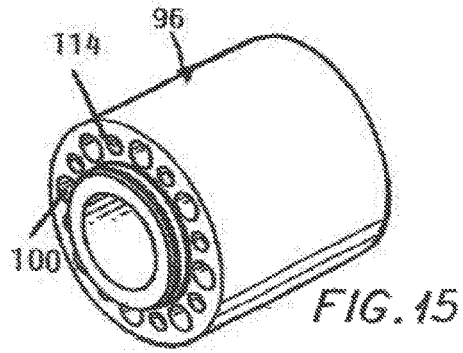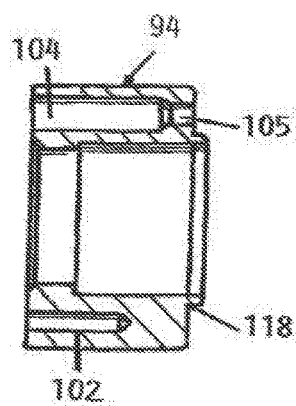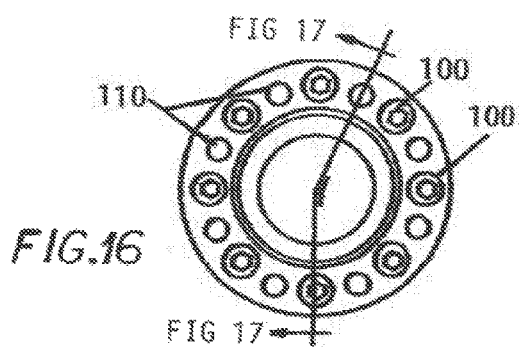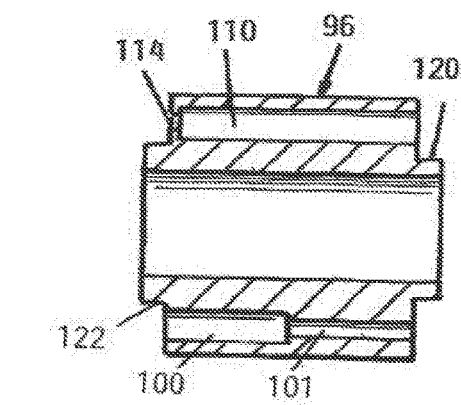
FIG 13
FIG.12
FIG.14
FIG.15
FIG.16
FIG.17

MOUNTING ARRANGEMENT FOR INSTALLING AUXILIARY VEHICLE WHEELS

CROSS REFERENCE TO RELATED APPLICATIONS

This application is a continuation in part of U.S. Ser. No. 14/702,853 filed on May 4, 2015 which claims the benefit of U.S. provisional patent application No. 62/146,529 filed on Apr. 13, 2015.

BACKGROUND OF THE INVENTION

This application concerns a mounting arrangement allowing one or more wheels to be added to a motor vehicle axle for achieving improved traction and support for the vehicle weight when being driven on unpaved surfaces.

It has long been realized that adding one or more auxiliary wheels to at least two vehicle axles will greatly improve mobility particularly when driving off road.

Various adapters and extensions have been devised to add such auxiliary wheels, but none of these have provided a practical and conveniently installed mounting of such wheels.

Any mounting must provide adequate support for the auxiliary wheel and should be convenient to install in the field when extra traction and support is needed.

Some prior mounting arrangements are complex and require special wheel rims, which add substantially to the expense of adding auxiliary wheels.

In other mountings, the mounted wheels are spaced too close together allowing mud to become packed into the gap between the wheels, which must be removed periodically.

Also, mountings for auxiliary wheels must not have any gaps or clearances between the moving components because the presence of such clearances may lead to loosening of the components over time. At the same time, some clearances are necessary in order to be able to easily assemble the components and connect them to an existing axle.

The components themselves must also be sufficiently sturdy to adequately support the auxiliary wheels, but also should not be too heavy such as to make the vehicle heavier and thus affect the rate of fuel consumption of the vehicle.

It is an object of the present invention to provide a mounting arrangement for adding auxiliary wheels to trucks or other motor vehicles, which also provides adequate support for any auxiliary wheels.

It is an additional object to provide such mounting arrangement which allows the use of standard wheel rims and is easy and quick to install when needed.

It is a further object to provide such mounting arrangement for adding auxiliary wheels which eliminates any clearances which could cause looseness over time while still allowing assembly of the wheel to the mounting components.

SUMMARY OF THE INVENTION

The above recited objects and other objects which will be understood by those skilled in the art are achieved by a mounting arrangement including two or more generally cylindrical spacers detachably connected together.

An inner spacer closest to the axle has a series of counterbored holes arranged about its perimeter opening into an outer end of the inner spacer, a larger diameter section of each hole is aligned with a smaller diameter hole opening into the inside end of the inner spacer. A series of wheel mounting studs projecting from an existing member of a brake assembly are inserted into the small diameter hole to have their ends disposed in the larger diameter hole sections. Stud nuts are inserted into the larger diameter holes from the outer end of the inner spacer and threaded onto the studs and advanced to engage the tapered end of the large diameter hole sections. The inner spacer has a reduced diameter portion projecting through a central wheel rim opening, with a lip extending around the rim opening displaced by tightening the stud nuts to seat the inner spacer against the side of the wheel rim and brake assembly member to be deflected inwardly into tight engagement with the outside diameter of a reduced diameter portion on the inner spacer to eliminate any clearances between the rim and the inner spacer.

An outer spacer is detachably connected to the inner spacer, to either have one end in direct abutment with an inside spacer end or with the inner and outer spacers separated and connected together by a separate intermediate spacer. If an intermediate spacer is included, the outer spacer has its inner end held in abutment with the outside end of the intermediate spacer. A counterbored opening is recessed into the inner side of the outer spacer which slidably receives a reduced diameter portion projecting from the outside end of the intermediate spacer.

The inside end of the outer spacer abuts the outside end of the intermediate spacer and is tightly held in that position by an annular series of bolts received into corresponding set of counterbored holes extending into the outside end of the outer spacer and received into corresponding threaded holes in the outside end of the intermediate spacer.

A series of interspaced stud bolts are received in a corresponding set of axial holes extending out from the inner end of the outer spacer and project out from the outer end of the outer spacer.

A rim of an auxiliary wheel to be installed has a large central opening defined by an inwardly angled lip into which is received an outer reduced diameter portion at the outside end of the outer spacer. The wheel rim has a set of holes into which is received the outer spacer stud bolts. Stud nuts are threaded onto the stud bolts and compress the wheel rim lip against a radial face formed by the reduced diameter portion on the outer spacer displacing the lip inwardly and into contact with the outside diameter of the reduced diameter portion to eliminate any clearance space.

The separate intermediate spacer may be eliminated by incorporating a larger outer spacer in the mounting arrangement. The stud holes are then extended through the longer outer spacer, and the outer spacer is bolted directly to the inner spacer thereby having ends in direct abutment.

The outer stud and stud nut holes are aligned with each other in this construction when the inner and outer spacers are bolted together. The inner and outer spacers are not joined together when the mounting arrangement assembly is initiated installation. The separated inner spacer is first installed on the studs projecting from the braking disc/hub assembly by stud nuts inserted into holes extending in from the outer end of the inner spacer, these holes large enough to accommodate a socket wrench to enable tightening of the stud nuts from the outside end.

The outer spacer is then attached to the inner spacer after the studs for mounting the auxiliary wheel rim have been installed, inserted into holes extending out from the inside end thereof and press fit in smaller holes which engage the studs to hold the threaded ends projecting from the outside end of the outer spacer, ready to receive the auxiliary wheel rim therein.

DESCRIPTION OF THE DRAWINGS

FIG. 7 is an enlarged fragmentary view of some of the components of the partially sectional view of FIG. 2 on the axially inboard side thereof.

FIG. 8 is an enlarged fragmentary view of a portion of the sectional view of FIG. 2 on the axially outboard side.

FIG. 12 is a pictorial view of an inner spacer included in the mounting arrangement shown in FIG. 9.

FIG. 13 is an end view of the inner spacer shown in FIG. 12.

FIG. 14 is a view of the section 14-14 taken in FIG. 13.

FIG. 15 is a pictorial view of an outer spacer included in the mounting arrangement shown in FIG. 9.

FIG. 16 is an end view of the outer spacer shown in FIG. 15.

FIG. 17 is a view of the section 17-17 taken in FIG. 16.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
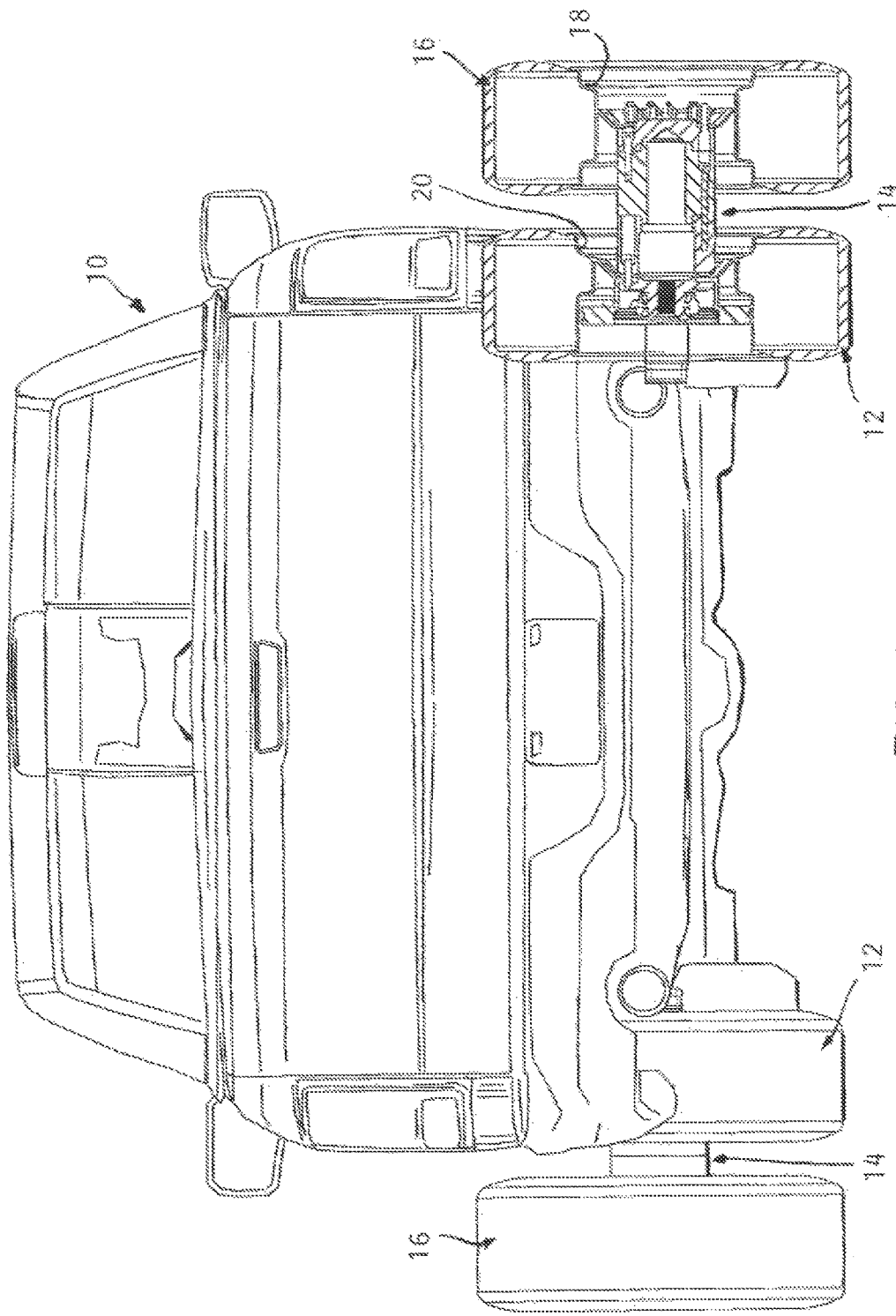
FIG. 1 is a pictorial rear view of a pickup truck having an auxiliary wheel installed on each rear axle using mounting arrangements according to the invention.

Referring to the Drawings, FIG. 1 shows a pickup truck 10 in which an auxiliary wheel 16 has been added on each side by means of a mounting arrangement 14 according to the invention.

Each auxiliary wheel 16 is located spaced outwardly spaced from the preexisting original equipment wheel 12 by the mounting arrangement 14.

The wheels 12, 16 are installed by attaching the standard rims 18, 20 of the wheels 12, 16 to a respective mounting arrangement 14 as described in detail hereinafter.

Figure 2:
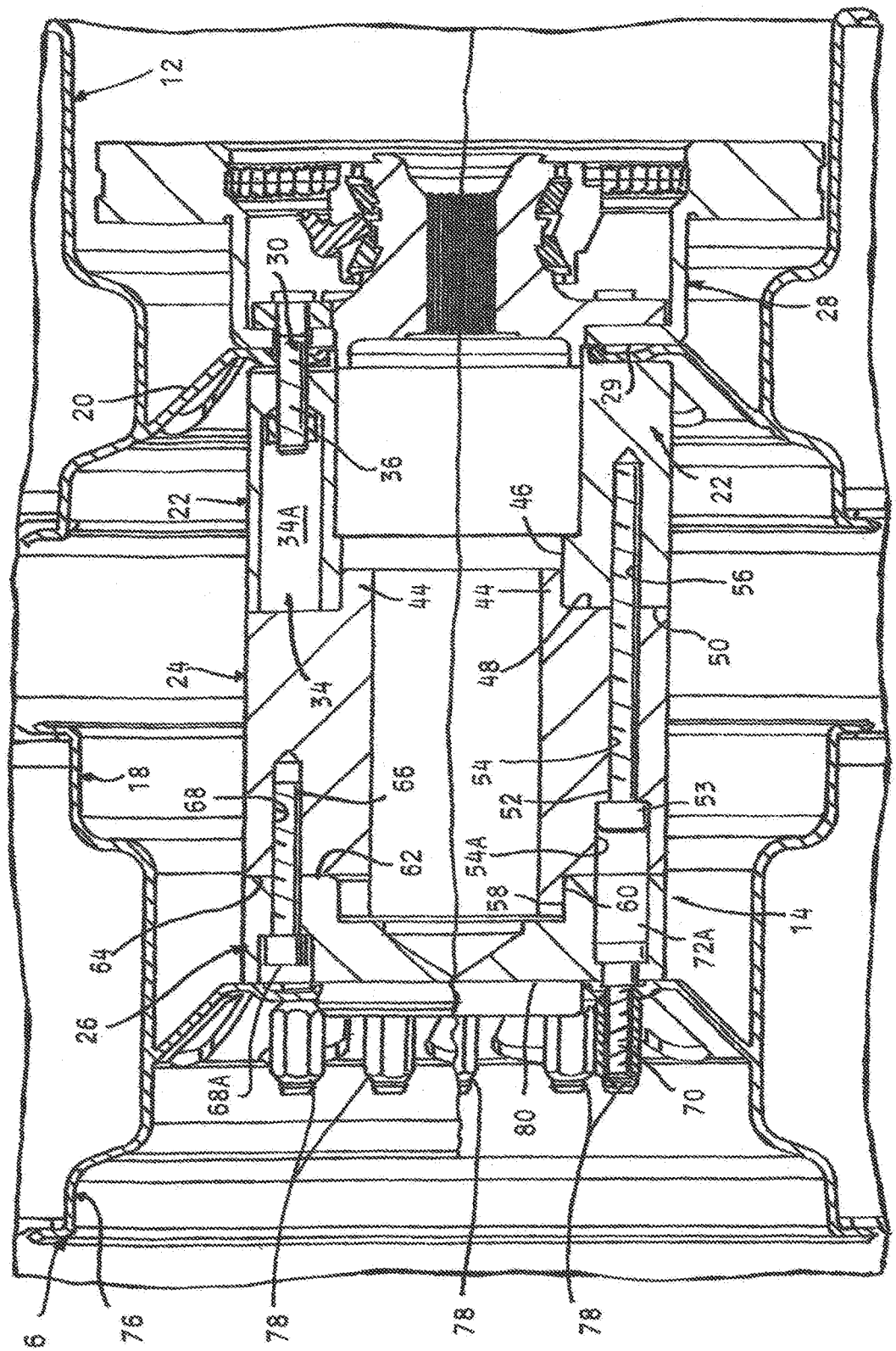
FIG. 2 is a partially sectional view of the mounting arrangement according to the invention assembled to each rear axle with a pair of auxiliary wheel rims installed thereon.
Figure 3:
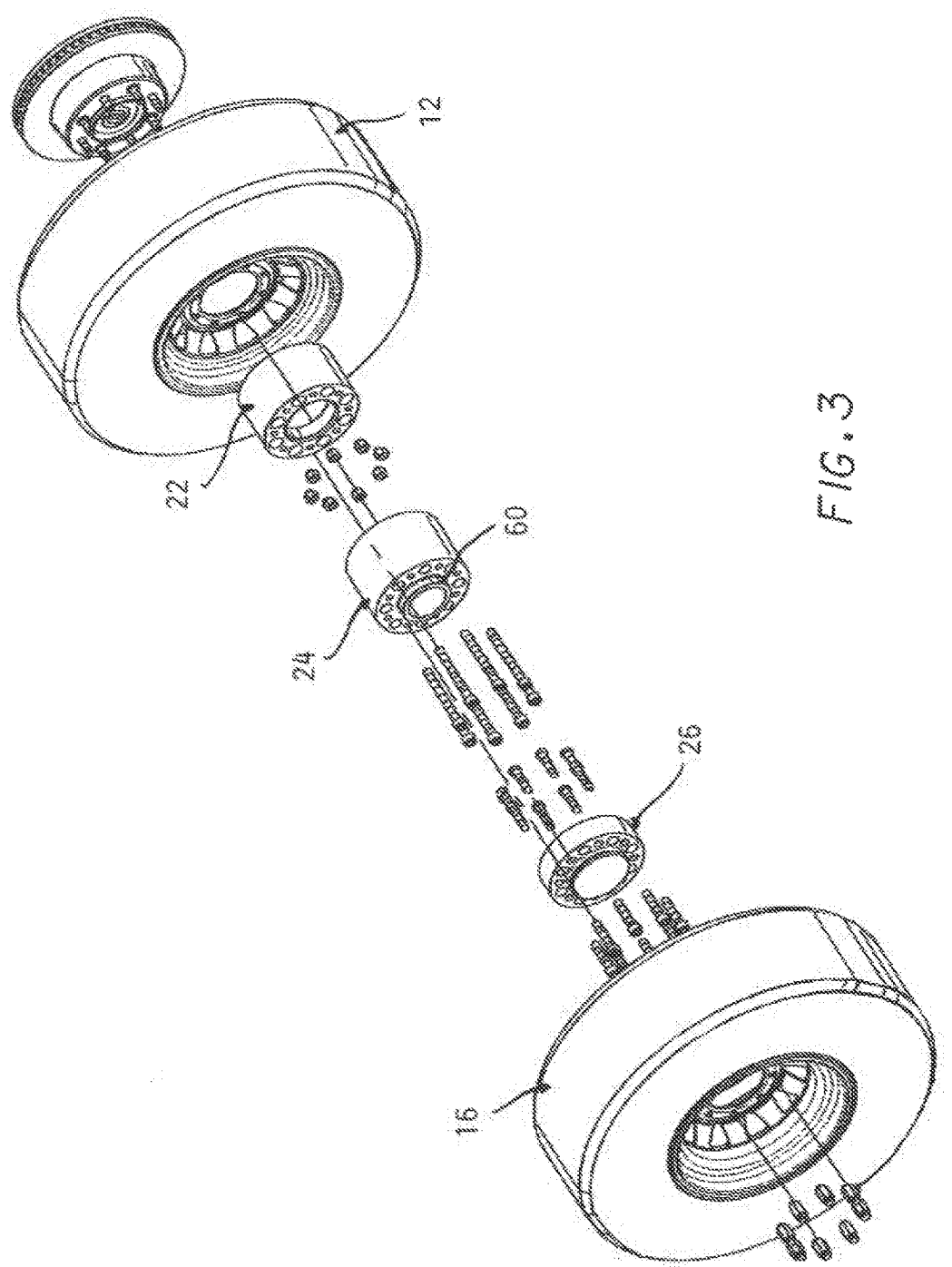
FIG. 3 is an exploded pictorial view from the left of the components of the mounting arrangement and the two wheel rims to be installed shown in FIG. 2.

Referring to FIG. 2, each mounting arrangement 14 is here comprised of three joined together spacers, a first or inner spacer 22, a second or intermediate spacer 24 and a third or outer spacer 26, each preferably made of aluminum and of a generally annular cylindrical shape.

Figure 4:
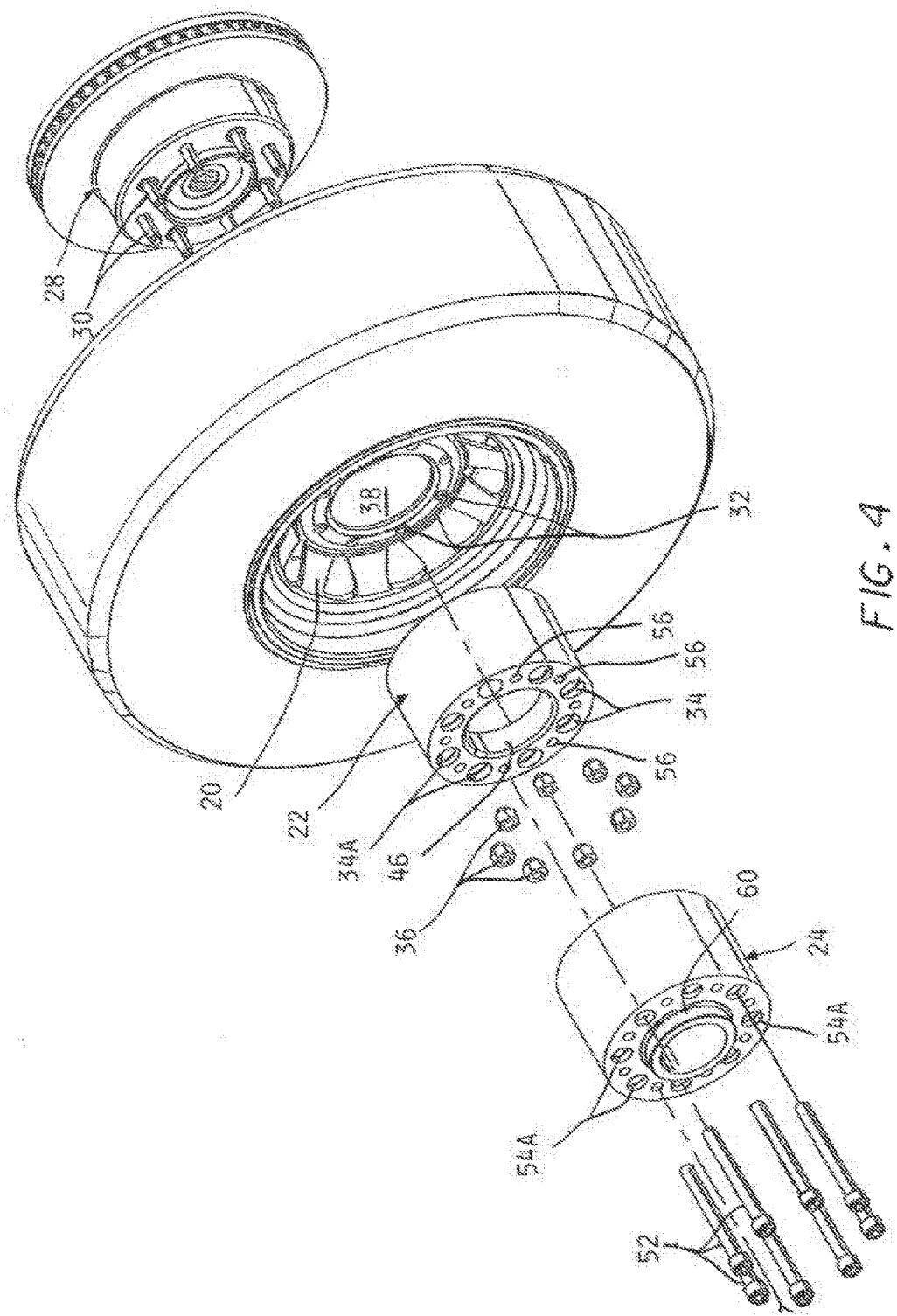
FIG. 4 is an exploded pictorial view from the axially inboard side of an original equipment wheel and some of the components of the mounting arrangement shown in FIGS. 2 and 3 associated therewith.

The inner spacer 22 is fixedly attached to an existing brake assembly member 28 by a set of stud bolts 30 which each pass through one of the holes 32 arranged around the wheel rim 20 (FIG. 4) and thence through an annular array of aligned counterbored holes 34 in the inner spacer 22. Stud nuts 36 are accommodated by the larger diameter portion 34A of counterbored holes 34 aligned with stud bolt receiving hole portions 34B so as to allow a socket wrench to be used to tighten the stud nuts 36 against the tapered ends and secure the wheel rim 20 in place by being clamped between the right side of the inner spacer 22 and the left side of a brake assembly member 28.

Figure 6:
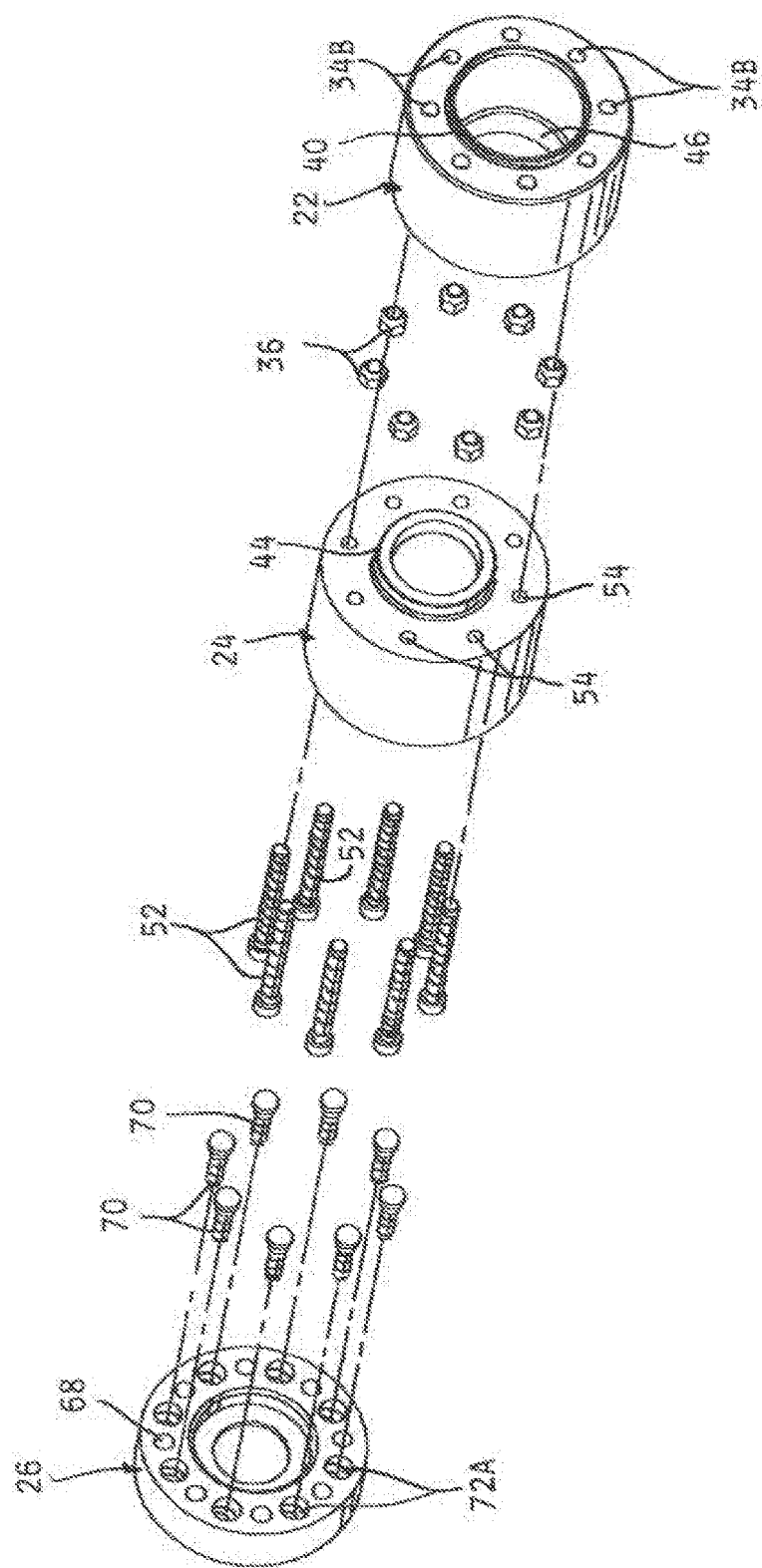
FIG. 6 is an exploded pictorial view from the right of the three spacers included in the mounting arrangement according to the invention.
Figure 7A:
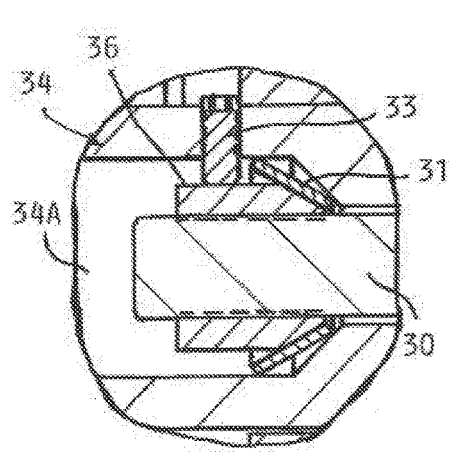
FIG. 7A is a further enlarged portion of FIG. 7 showing optional anti-loosening features for the stud nuts.
Figure 10:
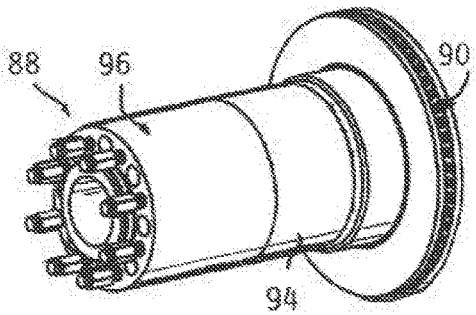
FIG. 10 is a pictorial view of a mounting arrangement assembled to the brake rotor member and hub assembly.
Figure 11:
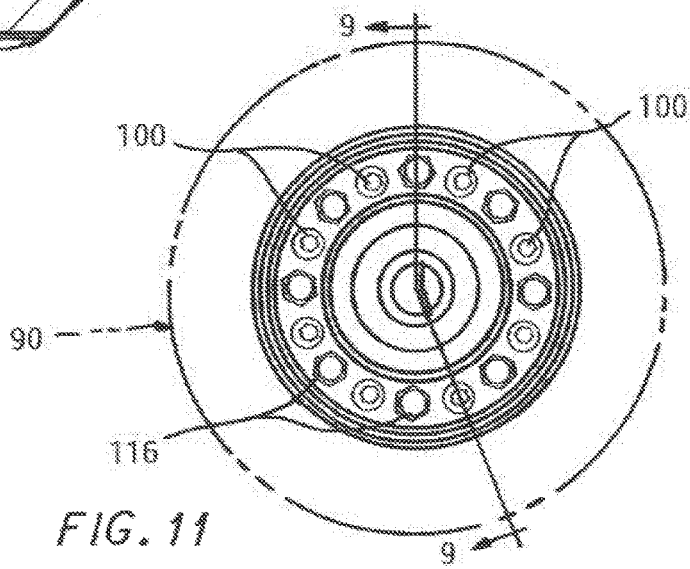
FIG. 11 is an end view of the mounting arrangement shown in FIGS. 9 and 10.
Figure 9:
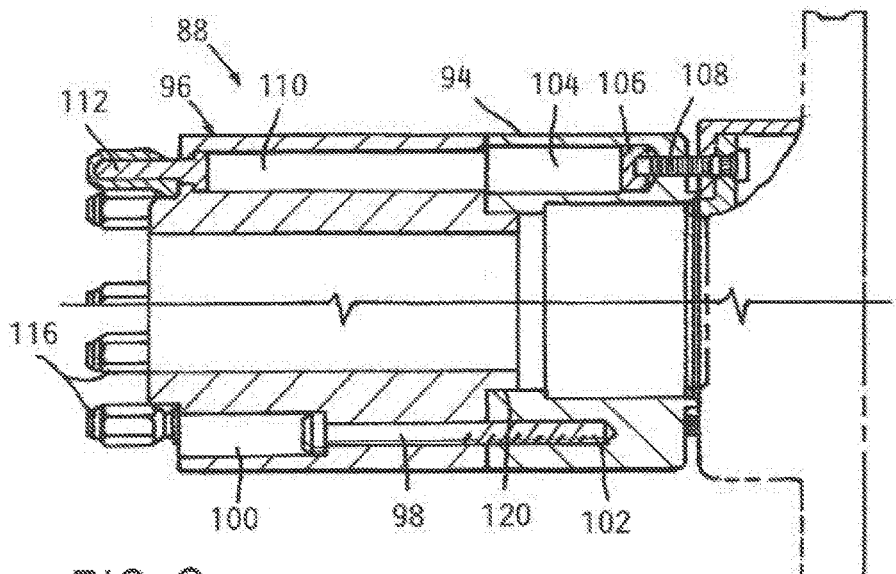
FIG. 9 is a partially exploded sectional view of another embodiment of an auxiliary wheel mounting arrangement according to the invention with a brake rotor member and hub assembly normally attached thereto but shown separated therefrom in the FIG. 9.

A large diameter opening 38 centered in the wheel rim 20 (FIG. 4) receives a reduced diameter end 40 (FIG. 7) of inner spacer 22 projecting through the opening 38 (FIGS. 6 and 7). Clearances are provided to enable assembly together of the wheel rim 20, the inner spacer 22, the stud bolts 30, the inside diameter 23 against a radial face 29 (FIG. 2) of the brake assembly member 28. However, these clearances could cause development of looseness in the connections over time as the wheels and the mounting spacers 22, 24, 26 are rotated at high speed when the vehicle is being driven.

The standard conventional wheel rim 20 therefore is formed with an angled lip 42 formed around the opening 38, which is shifted inwardly by tightening of the stud nuts 36 compressing the left side 42A of the wheel rim 20. This tightening of the stud nuts 36 forces the lip 42 to be deflected inwardly to engage the reduced diameter portion (FIG. 7) and completely eliminate any clearance to create a tight fit of the wheel rim 20 onto the inner spacer 22.

The radial face 40A is also thereby drawn into abutment with the original equipment wheel rim 20.

This compressive loading also maintains high frictional forces preventing loosening of the stud nuts 36.

The original equipment wheel rim opening 38 (FIG. 4) is defined by the angled lip 42 inclined inwardly towards the reduced diameter end 40 of the inner spacer 22 and the brake assembly member 28 to thereby be moved radially inwardly as the stud nuts 36 are tightened, whereby the angled lip 42 is forced into contact with the inner spacer reduced diameter end 40 by compressing one side of the wheel rim 20 between the brake assembly member 28 and the radially extending surface 40A of the inner spacer 22 formed by the reduced diameter end 40 to eliminate any clearance between the angled lip 42 and the reduced diameter end 40 (FIG. 7).

Optionally, spring washers 31 or set screws 33 (FIG. 7A) can be used to further secure the stud nuts 36 (and other described herein) against loosening.

The intermediate spacer 24 is formed with a reduced diameter portion 44 formed by a shoulder 44 which portion 44 is slidably received in the inside diameter of a left side counterbore 46 in the inner spacer 22 (FIG. 2) to be centered thereon.

The right end radial face 48 of the intermediate spacer 24 is held in abutment against the radial end face 50 of the inner spacer 22 by a circumferential array of long bolts 52 each received and passing through holes 54 extending axially completely through the intermediate spacer 24, with the threaded end of each bolt 52 advanced into a threaded hole 56 extending into the outer side of the inner spacer 22. The head 53 of each bolt 52 seats at the bottom of a counterbore 54A of each associated hole 54.

The outer spacer 26 has a recess 58 receiving therein a left side reduced diameter portion 60 formed by the associated step or shoulder with a sliding fit therebetween.

A right radial end face 62 of outer spacer 26 is held in abutment against a left end radial face 64 of the intermediate spacer 24 by a circular array of bolts 66 received in a respective one of holes 68. A counterbore 68A of each hole 68 accommodates the head of the bolt 66 received therein with sufficient clearance so as to allow tightening with a socket wrench (not shown).

A circular array of stud bolts 70 are installed to extend through stud holes 72 in outer spacer 26 with counterbores 72A accommodating the heads thereof. A press fit holds the stud bolts 70 therein in the well known manner.

The stud bolts 70 project through the left end of the outer spacer 26 and through mounting holes 74 of a conventional rim 76 of the auxiliary wheel 16.

Figure 5:
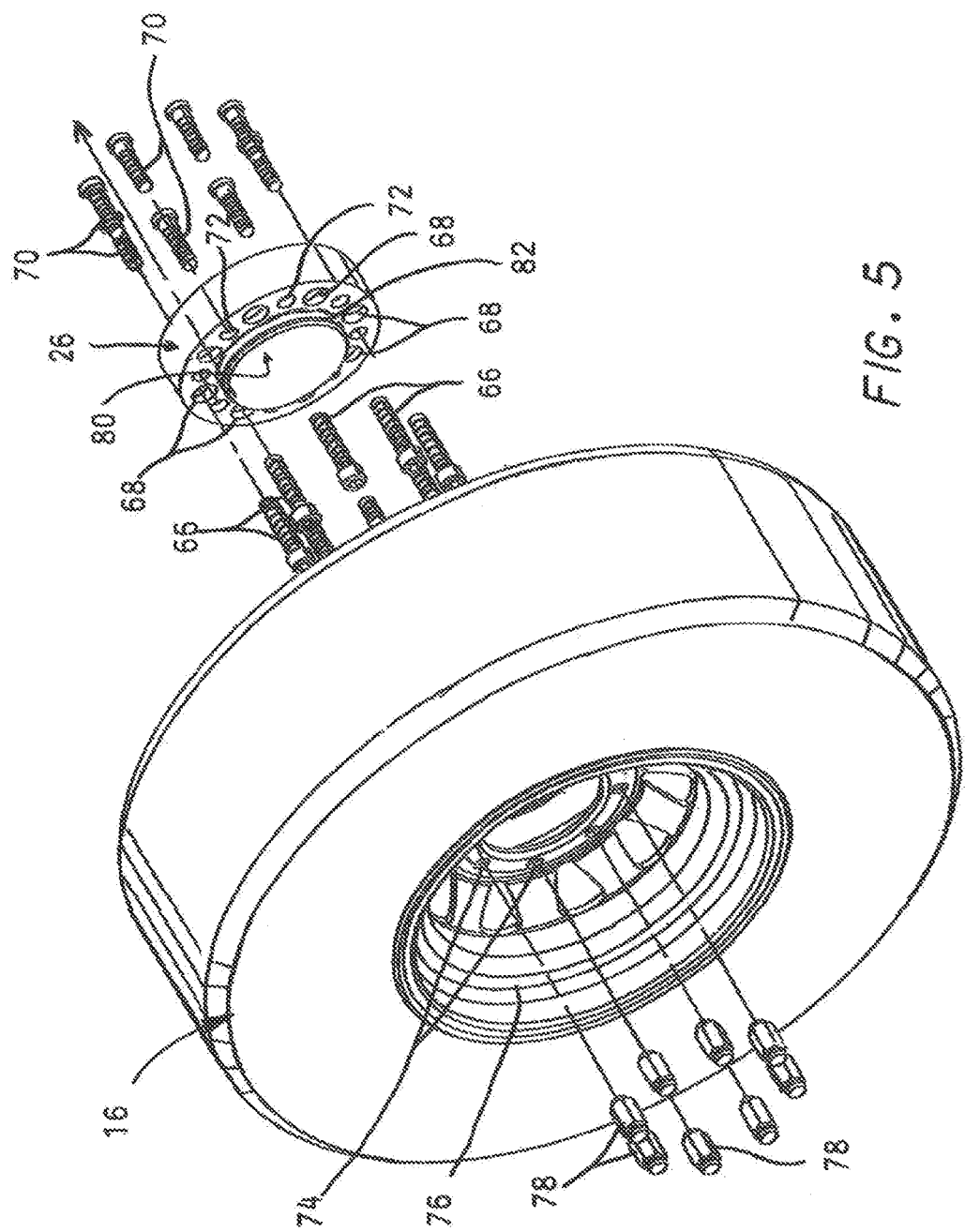
FIG. 5 is an enlarged exploded pictorial view from the axially outboard side of an auxiliary wheel to be installed and the components of the arrangement shown in FIGS. 2 and 3 associated therewith.

Stud nuts 78 installed on the stud bolts 70 draw the rim 76 tightly against a radial face 81 formed on left end 80 (FIGS. 5, 8) of outer spacer 26 by a reduced diameter end 82 thereof, best seen in FIG. 8.

Outer spacer 26 a reduced diameter end 82 forms and adjacent radial face 81 thereon. The reduced diameter end 82 slidably passes into the center hole 84 in the wheel rim 76.

A lip 86 is formed around the hole 84 of the wheel rim 76, angled radially inwardly towards the axially outside reduced diameter end 82 of the outer spacer 26 and back towards the radially extending face 81 adjacent the reduced diameter end 80 of the outer spacer 26.

Thus, the outer spacer 26 has a reduced diameter end 82 of a diameter smaller than the opening 84 in the wheel rim 76 which is thereby able to be slidably received over the reduced diameter end 82. The opening 84 is defined by the lip 86 on the rim 76 which is angled radially inwardly towards the reduced diameter end 82 of the outer spacer 26 and axially back towards the radial face 80 formed by the reduced diameter end 82 of the outer spacer 26. The lip 86 is moved radially inwardly by tightening of the stud nuts 78 to be brought into contact therewith, eliminating any clearance therebetween.

The stud nuts 78 when tightened compress the outside of the rim 76 to move the angled lip 86 radially inwardly forcing the lip 86 defining inside perimeter of the opening 84 (FIG. 8) against the reduced diameter portion 82.

The perimeter of the opening 84 has a radial clearance with reduced diameter portion 82 to allow assembly but upon tightening of the stud nuts 78 and inward movement of the lip 86 to engage the reduced diameter portion 82, all clearance therebetween is eliminated so that a tight fit is produced. This insures that no looseness develops over time, while assembly and disassembly of the wheel 12 is facilitated by the clearances which exist prior to tightening of the lug nuts 70.

The interfit spacers 22, 24, 26 when bolted together end to end provide a very sturdy cantilevered support for the auxiliary wheel 16 forming a unitary structure which will not loosen over time.

The thick walls of the annular spacers allow the use of aluminum in their construction to lighten their weight to enable easy handling when being installed and to reduce the rotating mass and unspring weight.

Standard wheel rims are used to lower the cost of the installation while the mounting ensures adequate spacing between the original equipment wheel and auxiliary wheel to avoid packing the space with dirt and other debris.

The deflection of the wheel rim lips 86 insures a tight fit to the mating spacers and wheels while allowing ready assembly of the wheel rims to the spacer assembly thereby provides achievement of the objects of the invention recited above.

FIGS. 9-17 show a second embodiment of the mounting arrangement 88 which is mounted to a brake rotor member 90 and hub assembly 92.

In this embodiment the separate intermediate spacer is omitted with an annular inner spacer 94 interfit to an annular outer spacer 96 by being fit over a reduced diameter portion 97 which are bolted together with a series of long bolts 98 received in counterbores 100 and threaded into aligned threaded holes 102 in the inner spacer 94.

Thus, the inner spacer 94 and outer spacer 96 are detachably connected directly together in direct contact with each other rather than by an intermediate spacer as described above. The outer spacer 96 is made longer than in the first described embodiment to provide adequate spacing to accommodate the auxiliary wheel (not shown).

The inner spacer 94 is also formed with counterbored holes 104 large enough to receive stud nuts 105 with sufficient clearance to accommodate a socket wrench to enable advance of the stud nuts 106 onto stud bolts 108 held on brake rotor member 90 and hub 92 and projecting through smaller hole 104 where the stud nut 106 is confined and advanced onto the stud bolt 108.

The outer spacer 96 has counterbored holes 100 which are sized to each accept a stud bolt 112 with an aligned smaller diameter hole 114 allowing the body of a stud bolt 112 to pass out the end of outer spacer 96 and through holes in a wheel (not shown) received over a reduced diameter portion 122 to enable securement thereon by a stud nut 112. The stud bolts 112 have splined features on their shanks press fit into the holes 114 to be held projecting out of outer spacer 96 as shown.

The inner spacer 94 has a reduced diameter portion 118 used to create a tight joint with the wheel as described above. The outer spacer 96 has a reduced diameter portion 120 on the right end as shown in the drawings which receives thereon the left end of the inner spacer 94 in order to align the two spacers 94, 96.

The outer spacer also has a reduced diameter portion 122 which is tightly fit to the auxiliary wheel rim opening (not shown), when the stud nuts are tightened in the manner described in connection with the first embodiment 14.

The invention claimed is:

1. An arrangement for adding an auxiliary wheel comprised of a tire mounted on a wheel rim to a member of a brake assembly of a motor vehicle on which is installed an original equipment wheel including a tire and rim, comprising:

a plurality of generally cylindrical spacers detachably connected together in axial alignment with each other, including an inner spacer having a circumferentially arranged series of stud holes, each receiving one of a set of stud bolts carried by a member of said wheel brake assembly of said vehicle, said inner spacer having a reduced diameter end adjacent said brake assembly member received into a hole in said rim of said original equipment wheel of said vehicle installed thereon, said stud holes each counterbored to accept a respective one of a set of stud nuts each threaded onto a respective stud bolt of said set of stud bolts which are advanced on to said stud bolts to force a radial face formed by said reduced diameter end of said inner spacer on an axially inside end of said inner spacer into abutment with said original equipment wheel rim which is thereby pressed against said brake assembly member;

an outer spacer detachably connected to said inner spacer in axial alignment therewith, said outer spacer formed with a reduced diameter end on an axially outside end of said outer spacer with said auxiliary wheel rim formed with an opening received over said reduced diameter end of an outside end of said outer spacer;

a circumferentially arranged set of counterbored holes extending axially into an axially inside end of said outer spacer aligned with a set of stud holes formed into said auxiliary wheel rim, a set of stud bolts inserted into a respective one of said counterbored holes and through a respective one of said auxiliary wheel rim set of stud holes, with a set of stud nuts each installed on a respective one of said stud bolts so as to force said auxiliary wheel rim against an adjacent radial face formed by said reduced diameter end of said outer spacer axially away from said inner spacer.

2. The arrangement according to claim 1 wherein said original equipment wheel rim opening is defined by an angled lip inclined radially inwardly towards said reduced diameter portion of said inner spacer and towards said brake assembly member, a side of said original wheel rim thereby compressed as said stud nuts are tightened whereby said lip is forced to be deflected inwardly and into contact with said reduced diameter portion of said inner spacer by compressing said original equipment wheel rim between said brake assembly member and said radial face on said inner spacer formed by said reduced diameter portion so as to eliminate any radial clearance between an inside surface of said lip and said reduced diameter portion of said inner spacer.

3. The arrangement according to claim 2 wherein said opening in said auxiliary wheel rim received over said reduced diameter axially outside end is defined by a lip on said auxiliary wheel rim defining the perimeter of said auxiliary wheel rim opening, said lip angled radially inwardly towards said reduced diameter axially outside end of said outer spacer and back towards a radially extending face adjacent said reduced diameter axially outside end of said outer spacer, said rim opening defined by said lip being larger in diameter than said reduced diameter axially outside end of said outer spacer to allow said rim to be assembled onto said reduced diameter axially outside end of said outer spacer, said auxiliary wheel rim compressed by tightening of said stud nuts engaging an outside of said rim of said auxiliary wheel so as to force said lip to move radially inwardly against said reduced diameter outside end of said outer spacer, thereby causing said lip to move radially inwardly to contact said reduced diameter outside end of said outer spacer to eliminate any clearance therebetween.

4. The arrangement according to claim 1 further including an intermediate spacer having an axially inside end abutting an axially outside end of said inside spacer, with a circumferentially arranged set of bolts each passing through a respective one counterbored hole of a set of counterbored holes extending axially completely through said intermediate spacer and into a respective one of a set of threaded holes extending in from said axially outside end of said inside spacer to fixedly hold said intermediate and inner spacers together abutted end to end; and said outer spacer having said axially inside end abutting an axially outside end of said intermediate spacer with a set of circumferentially arranged counterbored holes extending through said outer spacer aligned with a set of threaded holes extending into said outside end of said intermediate spacer and a set of bolts installed in a respective one of said counterbored holes and advanced into a respective one of said set of threaded holes to hold said ends of said outer spacer and intermediate spacer in abutment with each other whereby said inner spacer and said outer spacer are detachably connected together by said intermediate spacer located therebetween.

5. An arrangement for adding an auxiliary wheel comprised of a tire mounted on a wheel rim to an axle of a motor vehicle on which is installed an original equipment wheel, comprising:

a pair of spacers detachably connected together in axial alignment with each other, including;

an inner spacer having a circumferentially arranged series of holes formed therein, each hole receiving one of a set of stud bolts carried by a member of a wheel brake assembly of said vehicle, said inner spacer having a reduced diameter axially inside end slidably received in an opening in a rim of said original equipment wheel of said vehicle, said holes counterbored to accept one of a set of stud nuts each threaded onto a respective stud bolt which are advanced on said stud bolts to draw a radial surface formed by said reduced diameter axially inside end of said inner spacer into abutment with said wheel rim and said wheel rim against said brake assembly member; and an outer spacer detachably connected to and in alignment with said inner spacer a set of through holes extending axially into an axially inside end of said outer spacer aligned with a set of stud bolt holes formed in a wheel rim of said auxiliary wheel, a set of stud bolts inserted into said stud bolt holes and through rim holes of said wheel rim, with a set of stud nuts each installed on a respective one of said stud bolts so as to draw said wheel rim against a radial face produced by a reduced diameter outside end portion of said outer spacer, whereby said axially inside end of said inner spacer is fixed to said member of said brake assembly of said vehicle and to said wheel rim of said original equipment wheel, and said outer spacer reduced diameter outside end portion has said rim of said auxiliary wheel mounted thereto.

6. The arrangement according to claim 5 further including an intermediate spacer connected at an axially inner end thereof to an axially outer end of said inner spacer and at an axially outer end to said axially inside end of said outer spacer to thereby detachably connect said inner spacer to said outer spacer by said connections to said intermediate spacer, with one of said axially outer end of said inner spacer or said axially inner end of said intermediate spacer including a reduced diameter end slidingly received inside a bore formed in one of said axially outer end of said inner spacer or said axially inner end of said intermediate spacer to be aligned therewith.

7. The arrangement of claim 6 wherein one of said axially outer end of said intermediate spacer or said axially inside end of said outer spacer includes a reduced diameter end formed thereon and a bore is formed in the other of said intermediate spacer outside end or axially inside end of said outer spacer slidingly receiving said one of said reduced diameter ends therein.

8. The arrangement according to claim 5 wherein said original equipment wheel rim opening is defined by said angled lip which is inclined inwardly towards said inner spacer reduced diameter axially inside end and said brake assembly member aligned with said reduced diameter axially inside end to thereby be moved radially inwardly as said stud nuts are tightened whereby said lip is forced into contact with said inner spacer reduced diameter axially inside end by compressing one side of said wheel rim between said brake assembly member and a radially extending surface of said inner spacer formed by said reduced diameter axially inside end to eliminate any clearance between said lip and said reduced diameter axially inside end.

9. The arrangement according to claim 8 wherein said reduced diameter outside end of said outer spacer is of a diameter smaller than an opening in said auxiliary wheel rim received over said reduced diameter outside end portion, said opening defined by a lip on said rim defining the perimeter of said opening, said lip angled radially inwardly towards said reduced diameter outside end portion of said outer spacer and axially back towards a radial face formed by said reduced diameter outside end portion of said outer spacer, said rim opening defined by said lip slidably receiving said reduced diameter outside end portion thereon to allow said rim to be assembled onto said reduced diameter outside end portion, said lip moved radially inwardly by tightening said stud nuts engaging an outside of said rim of said auxiliary wheel forcing said lip to be moved radially inward against said reduced diameter outside end portion and into contact therewith to thereby eliminate any clearance.

* * * * *